United States Patent
Grady

(10) Patent No.: US 11,816,160 B2
(45) Date of Patent: Nov. 14, 2023

(54) SYSTEMS AND METHODS FOR UNIFIED GRAPH DATABASE QUERYING

(71) Applicant: INTUIT INC., Mountain View, CA (US)

(72) Inventor: Lior Azar Grady, Tel Aviv (IL)

(73) Assignee: INTUIT INC., Mountain View, CA (US)

(*) Notice: Subject to any disclaimer, the term of this patent is extended or adjusted under 35 U.S.C. 154(b) by 188 days.

(21) Appl. No.: 17/389,211

(22) Filed: Jul. 29, 2021

(65) Prior Publication Data
US 2023/0045347 A1   Feb. 9, 2023

(51) Int. Cl.
*G06F 16/901* (2019.01)
*G06F 16/242* (2019.01)
*G06N 20/00* (2019.01)
*G06F 18/214* (2023.01)

(52) U.S. Cl.
CPC ...... *G06F 16/9024* (2019.01); *G06F 16/2433* (2019.01); *G06F 18/214* (2023.01); *G06N 20/00* (2019.01)

(58) Field of Classification Search
CPC ............ G06F 16/9024; G06F 16/2433; G06F 18/214; G06F 30/27; G06F 16/258; G06F 16/254; G06F 16/2465; G06F 16/90335; G06F 16/972; G06F 16/245; G06F 9/541; G06F 16/8373; G06F 16/84; G06N 20/00; G06N 5/02; G06N 5/025; G06N 3/042; G06N 3/02; G06N 5/04; G06N 5/022
USPC ........................................................ 707/798
See application file for complete search history.

(56) References Cited

U.S. PATENT DOCUMENTS

| | | | |
|---|---|---|---|
| 10,042,836 B1 * | 8/2018 | Wang | G06F 16/9024 |
| 10,410,295 B1 * | 9/2019 | Hubbard | G06Q 40/123 |
| 2017/0177715 A1 * | 6/2017 | Chang | G06N 5/04 |
| 2017/0213157 A1 * | 7/2017 | Bugay | G06F 16/3329 |
| 2020/0320130 A1 * | 10/2020 | Korpman | G06F 16/8373 |
| 2022/0129766 A1 * | 4/2022 | Potts | G16H 70/20 |

* cited by examiner

*Primary Examiner* — Evan Aspinwall
(74) *Attorney, Agent, or Firm* — DLA PIPER LLP (US)

(57) ABSTRACT

A unified graph query system provides an abstraction layer that increases the interoperability of different graph technologies by exposing graphs stored in graph databases using a unified query language. The abstraction layer generates graph models for each of the available graph databases and extracts a graph component and other source data used to identify the source of the data requested by a query. The unified graph query system executes the query across the multiple graphs included in different graph databases by using the graph models to locate the graph component in each of the multiple graphs and extract the feature data associated with the graph component. The feature data is used to generate features that are used by a machine learning service to train machine learning models and is also used to make predictions in real time.

20 Claims, 6 Drawing Sheets

SYSTEMS AND METHODS FOR UNIFIED GRAPH DATABASE QUERYING

BACKGROUND

Graph databases are databases that use graph structures (e.g., nodes and edges) to represent and store data. Graph databases are widely used to store associative datasets that include various relationships between entities in the dataset. The unique structure and flexible schema of graph databases enables the associations between different entities in a dataset to be discovered faster and more efficiently relative to relational databases because join operations are not required. These advantages have resulted in the development and adoption of many different graph database solutions.

Each graph database technology has its own query language, deployment, and application programing interface (API) or other endpoints. As a result, solutions for querying and connecting to graph databases must be different for every graph database technology. The lack of uniformity between different graph technologies makes integrating with and using graph databases implemented on multiple graph database technologies slow, inefficient, expensive, and overly complex. Accordingly, there is a need to develop a solution that can query and integrate with graph databases of multiple graph database technologies.

DETAILED DESCRIPTION OF SEVERAL EMBODIMENTS

Figure 1:
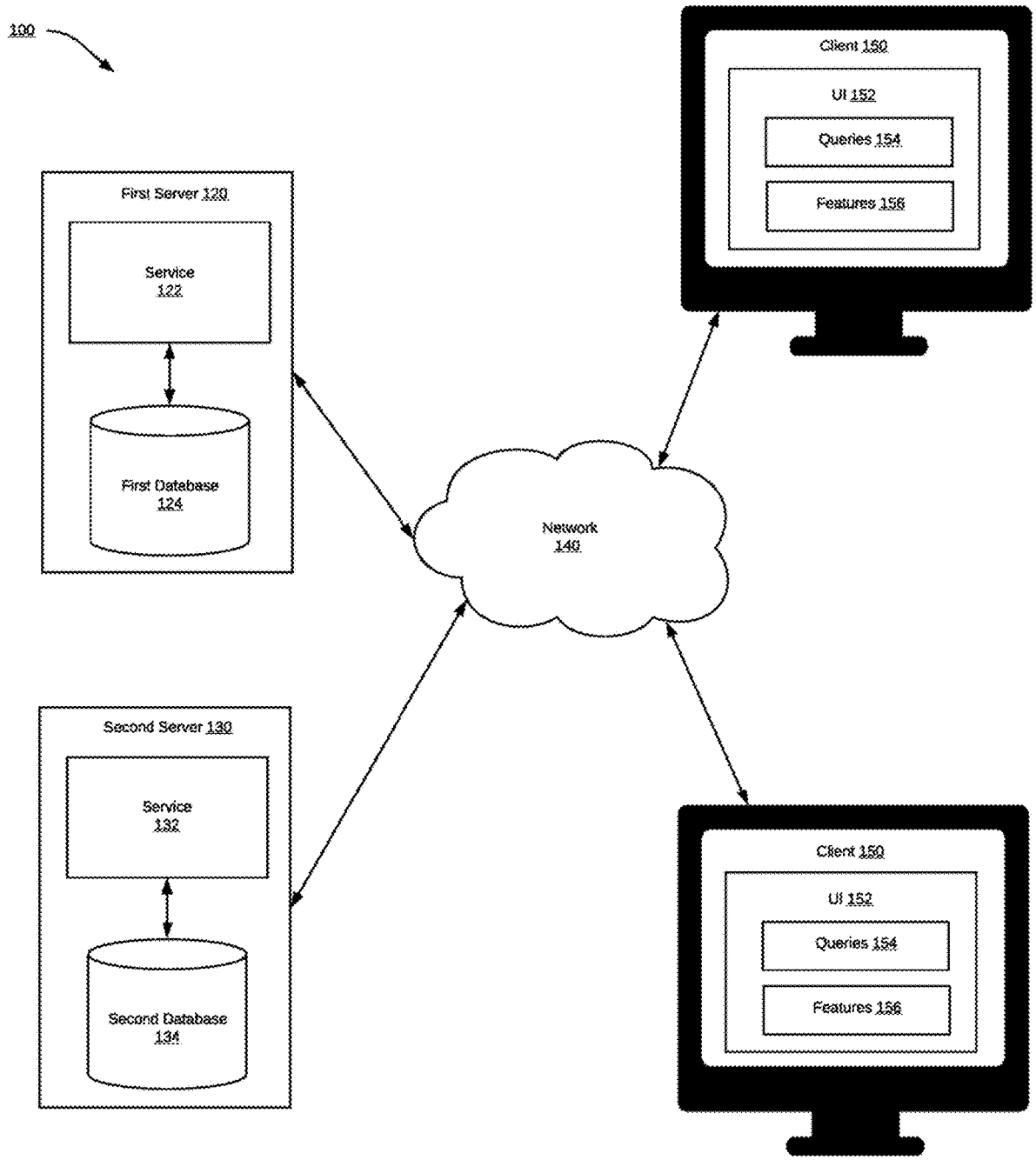
FIG. 1 illustrates an example system for querying graph databases according to various embodiments of the present disclosure.

The disclosed technology provides a new unified graph database querying system that increases the interoperability of different graph database technologies by enabling queries written in a domain specific language to be executed on any available graph database. The unified graph query service includes a graph abstraction layer that translates between a domain specific language used to write queries and the database query languages specific to each type of graph database. The graph abstraction layer eliminates the need to use a different query language for each graph database technology by modeling graph data in a domain specific language and running queries over the model.

The unified graph query service supports a service to service communication that enables integration between the abstraction layer, machine learning platforms, and other services that consume data extracted from the graph databases. For example, feature data extracted from graph databases is used to generate features that are used to train machine learning models. Data extracted by the unified graph query service is also used by an online prediction service to generate real time predictions. By enabling data to be extracted from any graph database using a single unified query the unified graph query service expedites the feature generation process for machine learning and reduces the total model training time. Reducing the number of queries running over the graph databases at one time also increases the stability of the data storage system hosting the graph databases and reduces the system's operating and maintenance costs. The unified graph query service also supports a client to service communication that enables users to search graph databases on multiple graph technologies using a single unified query. The unified query service improves the speed and efficiently of data extraction by eliminating the requirement to write multiple queries in different query languages to extract data stored in multiple databases.

Thus, the disclosed technology provides a unified query service that supports multiple graph database technologies. By replacing graph technology specific solutions with a uniform query solution that is compatible with every graph database technology, the unified graph query service reduces the development time and complexity of graph database query implementations. The simplified code base of the unified query service costs less to host and operate and is easier to maintain relative to graph specific solutions. The unified graph query service is used by machine learning applications to accelerate the feature generation process and reduce the training time for machine learning models. The unified graph query service also improves model accuracy by enabling more frequent feature extraction and faster model re-training. The unified graph query service also improves model accuracy by streamlining the feature engineering user experience for data scientists and other developers.

FIG. 1 illustrates an example unified graph data base querying system 100 configured to run queries across graph databases provided by multiple graph database technologies in accordance with the disclosed principles. System 100 includes a first server 120, second server 130, and or one or more client devices 150. First server 120, second server 130, and or client device(s) 150 are configured to communicate with one another through network 140. For example, communication between the elements is facilitated by one or more application programming interfaces (APIs). APIs of system 100 can be proprietary and/or can be examples available to those of ordinary skill in the art such as Amazon® Web Services (AWS) APIs or the like. Network 140 can be the Internet and/or other public or private networks or combinations thereof.

The first server 120 is configured to implement multiple graph databases provided by two or more graph database technologies. The multiple graph databases are stored in a first database 124 and a first service 122 manages and or provide access to the multiple graph databases. For example, the first service 122 performs graph database management tasks including updating the multiple graph databases with new data, syncing data across two or more of the multiple graph databases, encrypting or otherwise securing data included in and or received from the multiple graph databases and the like. The first service 122 includes a unified graph database query service that runs queries across two or more of the multiple graph databases. The unified graph database query service included in the first service 122 supports multiple graph query languages and multiple graph technologies to provide an efficient mechanism for extracting data from the multiple graph databases.

A second service 132 hosted on the second server 130 connects to the first service 122 to establish a server-to-server connection between the first server 120 and the second server 130. The second service 132 uses the unified graph database query service included in the first service 122 to extract data from the multiple graph databases included in the first database 124. For example, the second service 132 includes a machine learning service that automatically generates features for training machine learning models by querying the multiple graph databases. Features and other training data extracted from the multiple graph databases are stored in a second database 134 included in the second server 130.

Client device(s) 150 can be any device configured to connect to the first service 122 to establish a client-to-server connection between a client hosted by the client device(s) 150 and the first server 120. The client hosted by the client device(s) 150 includes a user interface (UI) 152 that receives input thereto to allow users to generate queries 154 for extracting data from the multiple graph databases stored in the first database 124. The unified graph query service included in the first service 122 runs the queries 154 across multiple graph databases hosted by different graph technologies to enable users to generate queries that extract data from the graph databases using one query language. The data extracted from the multiple graph databases using the queries 154 includes one or more features 156 that are used to by a machine learning system to train one or more machine learning models. The UI 152 displays the features 156 and other results for review on the client device(s) 150.

First server 120, second server 130, first database 124, second database 134, and client device(s) 150 are each depicted as single devices for ease of illustration, but those of ordinary skill in the art will appreciate first server 120, second server 130, first database 124, second database 134, and client device(s) 150 can be embodied in different forms for different implementations. For example, any or each of the first server 120 and second server 130 can include a plurality of servers or one or more of the databases 124, 134. Alternatively, the operations performed by any or each of first server 120 and second server 130 can be performed on fewer (e.g., one or two) servers. In another example, a plurality of client devices 150 communicate with first server 120 or second server 130. A single user can have multiple client device(s) 150, and or there can be multiple users each having their own client device(s) 150.

The disclosed technology provides a new unified graph database querying system that executes queries across graph databases implemented using multiple graph database technologies. The unified graph query service includes a graph abstraction layer that is compatible with any graph database technology. The graph abstraction layer eliminates the need to use a different query language for each graph database technology by modeling graph data in a domain specific language and running queries over the model. Therefore, the graph abstraction layer eliminates the need for data scientists, automated feature generation machines, and other users consuming data from the graph databases to have to learn different query languages for each graph technology and or be cognizant of—or store in memory—the graph technology implementation for each graph database including feature data requested by the query To model graph data, the graph abstraction layer maps the query to a query data model that defines the source data (i.e., the graph components, entity IDs, and other data indicating the source of the data requested by the query) included in the query in an extensible format. The source data is mapped to the graph databases using mapping data specifies the data types included in each graph. Graph databases mangers for the target graph databases including data types matching the source data are selected and used to execute the queries on the target graph databases.

The unified graph query service enables feature data to be extracted from graph databases implemented on multiple graph technologies using one unified query instead of a separate query for each graph database. The unified query service expedites the feature generation process for machine learning and reduces the total model training time by reducing the number of queries required to generate features and eliminating the need to combine feature data extracted using multiple queries. The improved efficiency in the feature generation process provided by the unified graph query service also enables features to be extracted more frequently (e.g., twice a day instead of once a day) without increasing the total number of queries run. The additional features are used to re-train the machine learning models to improve the accuracy of each model.

The unified graph query service supports a client to service communication that enables users to search graph databases on multiple graph technologies by entering queries into a client connected to the graph abstraction layer. Users can dynamically generate new features that include data from multiple databases implemented on different graph database technologies using queries written in the same domain specific language. The unified graph query service eliminates the need to identify the databases that include data associated with the graph components, entity IDs, and other source data included in query. These advantages increase the speed of the feature engineering process (i.e., extracting features for training data that are informative of a prediction target from raw data) by enabling new features to be created dynamically by writing queries in a single query language.

Figure 2:
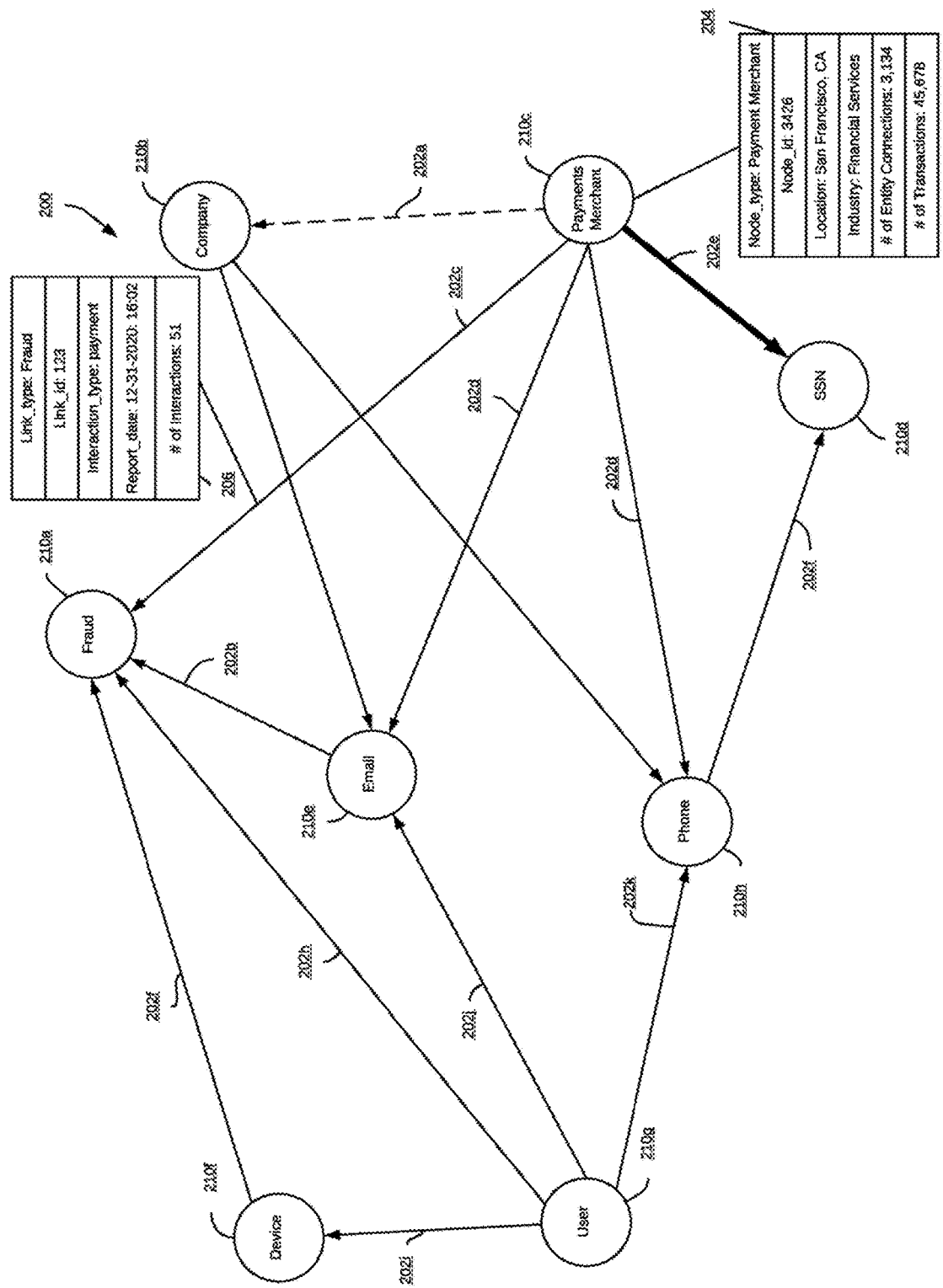
FIG. 2 illustrates an example graph included in a graph database according to various embodiments of the present disclosure.

FIG. 2 shows an example fraud graph 200. The fraud graph 200 contains multiple graph components (e.g., nodes, connections, links, and the like). Each of the multiple graph components can be labeled with a particular entity ID (e.g., link ID, connection ID, node ID, vertex ID, path ID, and the like). The multiple graph components include eight nodes 210a, 210b, 210c, 210d, 210e, 210f, 210g, 210h associated with node types including fraud, company, payments merchant, social security number (SSN), email, device, user, and phone respectively. Each node is connected to one or more nodes by a connection. The connections between each node can be directional (e.g., outbound or inbound). For example, the first node 210a (fraud) has an inbound connection 202b with the fifth node 210e (email). The direction of the inbound connection 202b is illustrated by the arrowhead pointing towards the first node 210a. The inbound direction provides additional data about the relationship between the connected nodes represented by the connection 202b. For example, the inbound connection 202b represents an email associated with the fraud node (e.g., an email address used by a known fraudulent entity, the email address of an entity sending an email to a known fraudulent entity, and the like). As can be appreciated, the connection 202b has an outbound direction from the perspective of the fifth node. The second inbound connection 202c to the first node 210a is a connection from the third node 210c (payments merchant). The second inbound connection 202c represents a financial transaction initiated by the payments merchant (e.g., wiring payment) that was sent to a fraud entity (e.g., a fake business, shell company, and the like) for completion (e.g., receiving payment). Therefore, the direction of the connection and the type of nodes linked by the connection indicates the type of interaction (i.e., email, phone call, transaction, and the like) and the role of each entity (e.g., vendor, customer, supplier, distributor, and the like) in the interaction.

The connections between the nodes can form links that correspond to a relationship between the connected nodes. Each of the links has a length which corresponds to the number of connections required to join the linked nodes. For example, the third node 210c (payments merchant) has a direct link (i.e., the second inbound connection 202c) with the first node 210a (fraud) because the third node 210c and the first node 210a are linked by a single direct connection. Therefore, the third node 210c and the first node 210a are joined by a link having a length of 1. In the illustrated example, the third node 210c and the first node 210a also have a second link having a length of two. The second link between the third node 210c and the first node 210a includes a first connection 202d from the third node 210c to the fifth node 210e (email) and a second connection (i.e., the inbound connection 202b) from the fifth node 210e to the first node 210a. The length of the links provides additional data about the relationship between the linked nodes. For example, the link length indicates the strength of the relationship between the nodes with directly connected nodes (i.e., nodes joined by a links having a length of 1) having a stronger relationship than nodes joined by indirect connections having a link length of 2 or more. The nodes included in the path can also include additional information (i.e., emails, phone numbers, account names, and the like) associated with one or more of the linked nodes and or used during the relationship described by the link.

Links and or connections between one or more nodes can also be weighted. For example, the second node 210b (company) has as a weak connection 202a (shown as dashed lines) with the third node 210c (payments merchant). The first node 210a (fraud) has a moderate connection 202f with the sixth node 210f (device). The outbound connection from the third node 210c (payments merchant) to the eighth node 210h (phone) and the outbound connection between the third node 210c and the fifth node 210e (i.e., the first connection 202d) are also moderate connections. A strong connection 202e is shown between the third node 210c (payments merchant) and the fourth node 210d (SNN). Connections can be weighted according to one or more connection attributes 206. For example, a strong connection 202e shown by a thick, bold line is used to represent several interactions between nodes, a recent interaction between nodes, and or an important interaction between nodes (e.g., a high dollar value transaction, an interaction involving a SSN or other piece of sensitive personal information, an interaction with an entity that has a lot and or few connections with fraud nodes or other particular node types, an interaction with an entity that has a lot of common connections with one or more linked entities, and the like). Weak connections represent, for example, a single interaction, infrequent interactions, an interaction that occurred a long time ago, and or a less important interaction between nodes (e.g., a low dollar value transaction, an interaction involving commonly shared and or public information, an interaction with an entity that does not have many other connections, and the like).

Connection and or link attributes 206 can also be added to the graph 200 to provide additional information about connections and or links. The attributes 206 can be different for each connection and or link ID included in the graph 200. The attributes 206 are extracted from transaction data, user profiles, and or other data stored on a relational and or graph database, for example, the first database 124. In various embodiments, attributes 206 include a connection and or link direction, a link type, an interaction type, a report date, a reporting entity, a number of interactions, and the like (only some of which are illustrated in FIG. 2). The attributes 206 included in the graph 200 can be listed as fields in the graph schema and can include data targeted by one or more queries. Each link and or connection type included in the graph 200 can have a different set of attributes 206. Therefore, the graph schema includes a unique set of fields associated with each link and or connection type.

One or more node attributes 204 can also be added to the graph 200. The node attributes 204 include additional data that describes each of the node types included in the graph 200. The node attributes 204 can be different for each node ID included in the graph 200. The node attributes 204 are extracted from transaction data, user profiles, and other data stored on a relational and or graph database such as, for example, the first database 124. The node attributes 204 include, for example, node type, node ID, location, industry, number of entity connections, and the like, and connection statistics describing connections and or other interactions between a particular node and other nodes included in the graph. The connection statistics can include a number of outbound interactions, a number of inbound interactions, gross amounts for any transition interactions, average transaction amount, average number of transactions, total number of interactions, frequency of interactions, most common interactions, and the like (only some of which are illustrated in FIG. 2). The node attributes 204 included in the graph 200 can be listed as fields in the graph schema and can include data targeted by one or more queries. Each node type included in the graph 200 can have a different set of node attributes 204. Therefore, the graph schema includes a unique set of fields associated with each node type.

In one user interface (UI) provided by the unified graph query service, connection and or link attributes 206 and or node attributes 204 are shown on the graph 200 as shown in FIG. 2. The UI can also include a function for making the graph 200 dynamic. For example, the UI can display the connection or link attributes 206 and or the node attributes 204 in response to a user hovering over and or selecting a connection or node. It should be appreciated that the illustrated graph 200 is just an example and that it, and the underlying data discussed below, are mere examples of the disclosed principles and do not limit the scope of the disclosure.

The example graph 200 was constructed based on an exemplary input data set shown in the following table:

| Initiating node | Receiving node | Number of interactions | Most recent interaction date | Interaction type |
|---|---|---|---|---|
| Payments Merchant | Fraud | 5 | 21 Feb. 2020 | Fraud |
| Payments Merchant | Company | 31 | 13 Mar. 2020 | Transaction |
| Payments Merchant | Phone | 6 | 12 Feb. 2020 | Communication |
| Payments Merchant | SSN | 8 | 23 Feb. 2020 | Security |
| Phone | SNN | 1 | 6 Jun. 2020 | Security |
| Company | Phone | 7 | 25 Feb. 2020 | Communication |

| Initiating node | Receiving node | Number of interactions | Most recent interaction date | Interaction type |
|---|---|---|---|---|
| User | Phone | 8 | 19 Feb. 2020 | Communication |
| User | Device | 8 | 20 Feb. 2020 | Setup |
| User | Fraud | 8 | 21 Feb. 2020 | Fraud |
| Device | Fraud | 8 | 22 Feb. 2020 | Fraud |
| User | Email | 3 | 17 Jul. 2021 | Communication |
| Email | Fraud | 9 | 23 Oct. 2021 | Fraud |
| Company | Email | 7 | 13 Jul. 2021 | Communication |

To construct the example graph 200, the input dataset was mined from financial transaction data, user data, and account activity records. These datasets are used to determine the connections and or links between nodes, the direction of the connections, the strength of the connections, and the like. As shown in the graph 200, three connection strengths were used: weak (e.g., the weak connection 202a), strong (e.g., the strong connection 202e), and moderate (all other connections). The direction for each connection is shown by the direction of the arrow representing each connection. Connection types, node types, link types, node attributes, connection attributes, link attributes, and other data discussed herein were not included in the example input data table.

Figure 3:
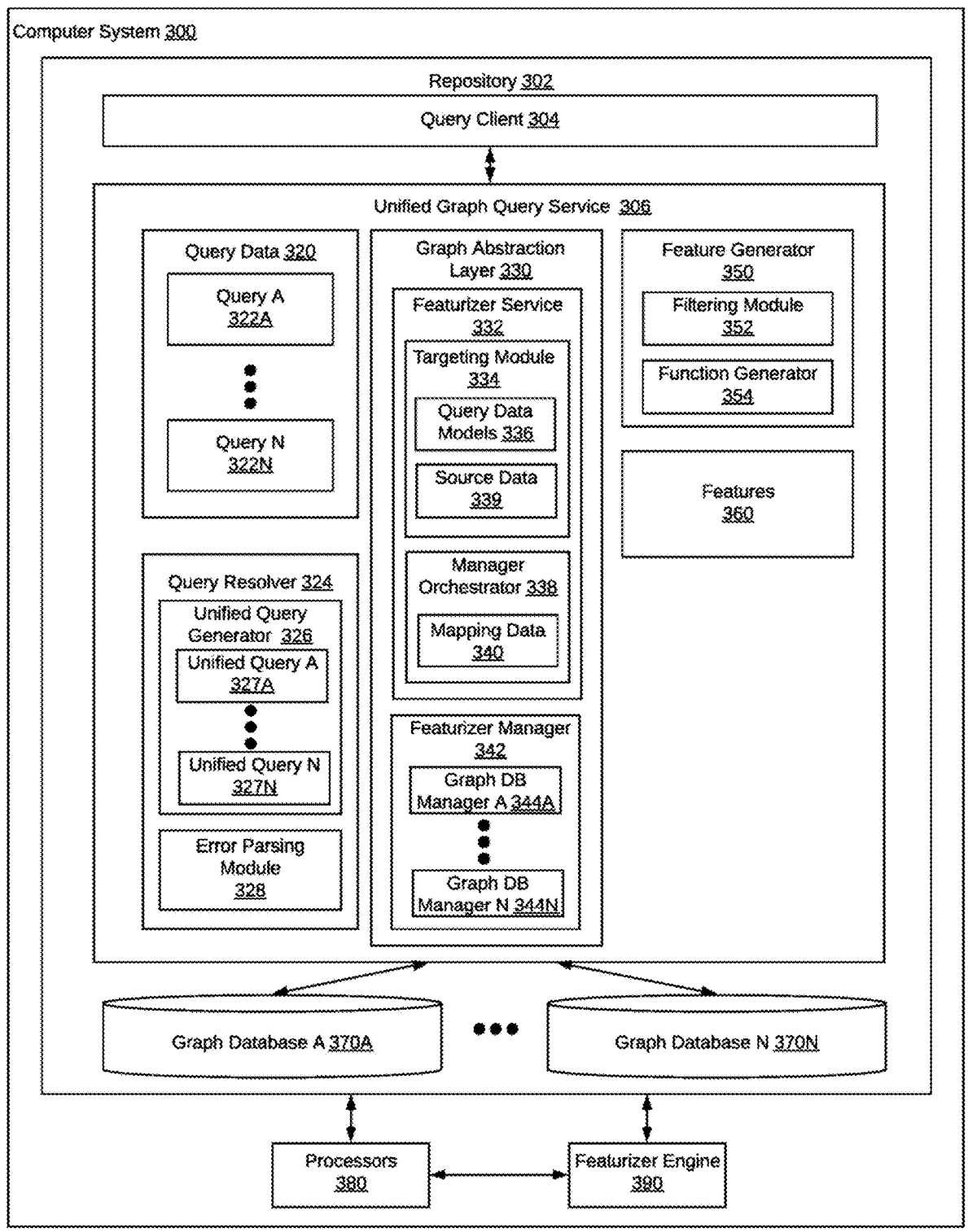
FIG. 3 shows more details of the example system shown in FIG. 1 according to various embodiments of the present disclosure.

FIG. 3 is a block diagram illustrating an example computer system 300 in accordance with one or more embodiments disclosed herein. The computer system 300 includes a repository 302, a featurizer engine 390, and one or more computer processors 380. In one or more embodiments, the computer system 300 can take the form of the computing device 600 described in FIG. 6 and the accompanying description below or the form of the client device 150 described with respect to FIG. 1. In one or more embodiments, each computer processor 380 takes the form of the computer processor 602 described with respect to FIG. 6.

In one or more embodiments, the repository 302 can be any type of storage unit and or device (e.g., a file system, database, collection of tables, or any other storage mechanism) for storing data. Further, the repository 302 can include multiple different storage units and or devices. In one or more embodiments, the repository 302 includes a query client 304, a unified graph query service 306, and one or more graph databases 370A, . . . , 370N. The unified graph query service 306 accepts query data 320 from the query client 304 and uses a graph abstraction layer 330 to execute queries written in a uniform query language across multiple graph databases 370A, . . . , 370N implemented using one or more graph technologies.

By making queries 322A, . . . , 322N written in one query language compatible with graph databases implemented using any graph technology, the unified graph query service 306 provides a simplified software implementation for exposing multiple graph databases. The graph query service 306 provides a single endpoint that is used to query all of the available graph databases. This implementation is much more efficient (e.g., requires fewer lines of code, costs less to maintain, takes less time to troubleshoot, and is easier to upgrade) than existing implementations that require a separate API or other query specific endpoint that includes the connections to each database. The unified graph query service 306 also reduces the number of queries running over the graph databases by replacing query specific APIs that are hardcoded to execute one specific query with a flexible query service that can execute queries across multiple graphs on any available graph database. Hardcoded query specific APIs require running several queries to generate feature data that includes query results from multiple databases (e.g., one query per piece of feature data, per graph, and or per graph database). The unified graph query service 306 is a single graph database endpoint that maps the graph component, entity ID, and other source information included in the query with the target graph databases that include graphs having the graph component, entity ID, and other source information. The unified graph query service 306 executes a single unified query across all of the target databases to efficiently generate the complete set the feature data requested by the query. Reducing the number of queries running over the graph databases increases the performance (e.g., query response time, power usage, memory usage), availability, and stability of the server, virtual machine, cluster, or other physical and or virtual hardware hosting the graph databases.

The unified graph query service 306 also increases the interoperability between different graph technologies to enable services consuming data in multiple graphs to interact with multiple graph databases and multiple graph technologies more efficiently. Currently, connections between graph databases and services using the graph databases are hardcoded for a particular graph technology. Any modifications to the existing graph technology (e.g., changing to a different graph technology, adding databases from other graph technologies, removing a graph technology, and the like) requires writing an entirely new query implementation that includes new connections between the graph databases and services that are specific to the new set of graph technologies. The flexible framework of the unified graph query service 306 is configured to be compatible with any graph technology. The unified graph query service 306 accommodates changes to graph databases and or technologies, by minor modifications to the data layer (e.g., adding a new and or updated model for the modified graph databases and or technologies) of the unified graph query service 306 implementation. Modifying the data layer of the existing unified graph query service 306 requires less development time and resources relative to writing an entirely new query implementation. Additionally, the unified graph query service 306 implementation can be adapted to new graph databases and graph technologies without requiring changes to the connections, deployments, and other code for the services connected to the unified graph query service 306. For example, the unified graph query service 306 can adapt to changes in the graph data storage system that adds a new database or changes from a TigerGraph database technology to an AWS Neptune implementation without changing the connection between the services consuming graph data (e.g., a machine learning platform) and the unified graph query service 306.

The unified graph query service 306 also increases the efficiency of data extraction from graph databases. Instead of having to hardcode an API for each operation performed on one or more graph databases, the unified graph query service 306 enables dynamic design of features and other objects assembled using data included in one or more graph databases. The unified graph query service 306 exposes graph databases implemented on any graph technology using a single graph query language. The unified graph query service 306 also manages the execution of each query to prevent system crashes and other errors that occur because of query writing errors (e.g., query writing errors that accidentally cause too much data to be loaded by the system). To execute queries requesting data stored in multiple databases (e.g., a number of fraud links to a particular merchant ID or other target entity), the unified graph query service 306 includes some mapping logic that determines the graph database managers to user to execute the query. The mapping logic can include, for example, logic that maps the source data (e.g., the merchant ID) included in the query to all of the available graph databases to identify the target graph databases that include data associated with the source data. The mapping logic may also map source data to the full schema of each of the available graph databases to identify the target graph databases. Any other mapping logic may be used to identify the target databases and select the database managers corresponding to the target databases. The unified graph query service 306 then executes the query on the identified target databases (e.g., a first graph database implemented on the TigerGraph platform that includes the vendor fraud links for the merchant ID and on a second graph database implemented on the AWS Neptune platform that includes the custom fraud links for the merchant ID entity) instead of trying to load all of the graphs from all of the available graph databases into memory at once.

As shown in FIG. 3, the unified graph query service 306 receives query data 320 from a query client 304. The query client 304 provides a user interface (UI) for entering queries and other inputs. For example, the query client 304 can include a text editor that provides a free form text box for entering queries in GraphQL or any other domain specific language (DSL). To allow users to compose queries in the query client 304 faster than manual typing, the text editor can include an auto-complete function and or other language generation technology that automatically generates one or more portions of a query. The text editor can expose the schema model for the available graph databases to enable portions of the query that include a particular part of the schema (e.g., a node type, connection type, attribute type and the like) to be auto-completed and or auto-generated. The auto-generation and auto-complete functions of the query client 304 also increase the accuracy of queries by eliminating syntax errors caused by misspellings, typing errors, and other human errors. The query client 304 can auto-generate previously input queries and or auto-complete query fields, DSL syntax (e.g., functions, objects, variables, linking words, and the like), and other aspects of queries. The UI provided by the query client 304 can also include a drop-down box or other selection menu that presents auto-generation options to users. Users select one or more of the auto-generation options to automatically add the selected options to the query. The text editor provided by the query client 304 can also highlight, change the font color, or otherwise distinguish one or more portions of the query from the rest of the text input into the UI. For example, the graph components (e.g., node types, link types, and the like) and fields (e.g., link length, connection strength, node ID, link ID, and the like) can have a different font color than the other text included in the query.

The query client 304 is configured to accept queries in any query DSL. For example, the query client 304 accepts queries written in GraphQL, Cypher, Gremlin, a custom DSL, and the like. Queries input into the query client 304 are transmitted to the unified graph query service 306 as query data 320. The query client 304 is configured to allow the unified graph query service 306 to support server-to-server communications and client-to-server communications. For server-to-server communications, queries received by the query client 304 are generated automatically by a machine learning platform or other service hosted on a server. For example, the query client 304 receives a query that generates features for training a machine learning model from a machine learning platform according to a pre-defined schedule (e.g., every day, every week, and or any other time period). The machine learning platform and other services can also communicate queries and other query data 320 to the unified graph query service 306 directly. For client-to-server communications, the query client 304 displays the query client 304 UI on one or more client devices (e.g., smartphones, laptops, desktop computers, tablet, and the like). Users enter queries into the query client 304 by entering inputs into the UI (e.g., typing in a free form text box provided by a text editor or other application) and the query client 304 transfers the queries received in the UI to the unified graph query service 306 as query data 320.

Query data 320 received by the unified graph query service 306 can include one or more queries 322A, . . . , 322N. The queries 322A, . . . , 322N are queries written in a DSL. For example, the queries 322A, . . . , 322N can request feature data associated with a particular graph component (e.g., all of the links between a particular node ID and another particular node ID, all of the links between a particular node ID and all nodes having a particular node type, all links between the nodes of two particular node types, and the like) The queries 322A, . . . , 322N can also specify a specific link type (e.g., links to fraudulent entities, links to customers, links to invoices generated during a particular time period, and the like), node type (companies, payment merchants, fraud instances, users, phone numbers, email addresses, and the like) and or one or more target databases to search. The queries 322A, . . . , 322N can also request aggregate data associated with a particular graph component (e.g., a number of links connected to a particular node ID, the strongest connection including a particular node ID, the shortest link length including a particular node ID, the average link length for multiple links included a particular node ID, and the like. Each type of link and or node can be associated with one or more graph databases and the queries 322A, . . . , 322N can be executed across all available graph databases.

The queries 322A, . . . , 322N included in the query data 320 can be written in any DSL and can target one or more graph databases implemented on multiple graph technologies. The unified graph query service 306 enables queries 322A, . . . , 322N formatted in a particular DSL to be executed on any graph database implemented on any graph technology by providing an abstraction layer 330 that exposes all available graph databases to a single query language. The unified graph query service 306 enables queries 322A, . . . , 322N written in GraphQL, Gremlin, or any other DSL to be executed across graph databases implemented on different graph technologies (e.g., TigerGraph, AWS Neptune, DSE Graph, and the like) including graph technologies that are not compatible with the graph query language of the queries 322A, . . . , 322N.

Query data 320 is reviewed by a query resolver 324 that validates the query language of each of the queries 322A, . . . , 322N included in the query data 320. To validate the query, an error parsing module 328 included in the query resolver 324 checks each of the queries 322A, . . . , 322N for errors that prevent the queries 322A, . . . , 322N from being executed. For example, the error parsing module 328 may validate the queries 322A, . . . , 322N by checking the queries 322A, . . . , 322N against a schema file for the DSL (e.g., Graph QL schema file) to confirm that the queries 322A, . . . , 322N are written in the DSL. The errors identified by the error parsing module 328 can be general errors. For example, general errors that can be found in queries 322A, . . . , 322N written in any query language (e.g., the query is written in the wrong query language, the name of the graph component, entity ID, database, and the like targeted by the query is missing, the name of the database fields targeted by the query is missing, and the like). The error parsing module 328 also identifies errors that are specific to a particular DSL (e.g., GraphQL, Cypher, Gremlin, a custom DSL or another DSL that is accepted by the query client 304). For example, the error parsing module 328 determines that the syntax of a query written in GraphQL includes an error that prevents the query from being executed by the unified query service 306. In another example, the error parsing module 328 determines the format of the name of the graph and or the format of the name of the field targeted by a query written in Gremlin includes an error that prevents the query from being executed on the DSE graph platform. Errors detected by the error parsing module 328 along with an error message that includes an explanation of the identified error are transmitted to the query client 304. The query client 304 displays the query including the error and the error message to a user for client-to-server connections. For server-to-server connections, the query client 304 communicates the error and the error message to a service, server, or other automated system.

The validation performed by the query resolver 324 ensures that all of the queries 322A, ..., 322N accepted by the unified graph query service 306 are in a format that is compatible with the graph abstraction layer 330. For example, the query resolver 324 parses the queries to 322A, ..., 322N to covert the DSL used to write the queries to 322A, ..., 322N into a framework language (e.g., Java, Python, .NET, and the like) that is readable by the graph abstraction layer 330. The query resolver 324 maps each expression included in the queries 322A, ..., 322N to an equivalent expression in the framework language using a schema file the associates expressions in each query that are specific to a particular query language with equivalent expressions in the framework language.

Queries 322A, ..., 322N that are converted into the framework language are validated by the query resolver 324 to confirm the inputs into the graph abstraction layer 330 may be read by the featurizer service 332. Queries that are not expressed the framework language or another language that is not compatible with the graph abstraction layer 330 are not validated by the query resolver 324 and are returned to the user in a client-to-server connection with the unified graph query service 306 or a server, service, or other automated system in a server-to-server connection with the unified graph query service 306. Validated queries that are successfully parsed to the framework language are normalized by the unified query generator 326 to generate unified queries 327A, ..., 327N for each of the validated queries. The normalization function performed by the unified query generator 326 ensures queries 322A, ..., 322N written in any DSL are converted into the same unified input format that is readable by the graph abstraction layer 330.

The unified query generator 326 can normalize the queries 322A, ..., 322N using machine learning and or rules based techniques. For example, the unified query generator 326 can parse the graph components, data types, and other targeting data identifying the requested data from the queries 322A, ..., 322N using a named-entity recognition machine learning model. The named-entity recognition model can be trained to extract source data from queries 322A, ..., 322N written in any DSL based on features extracted from training datasets including a large volume (e.g., hundreds, thousands, or any other number) of sample queries with the targeting data labeled in each query. The training datasets and named entity recognition models can be specific to a particular DSL and or can be extensible to multiple DSLs. The unified query generator 326 can also parse targeting data from the queries 322A, ..., 322N based on a query data model 336 that identifies the location, syntax, format, and other characteristics of targeting data included in queries 322A, ..., 322N. The query data model 336 can be specific to a particular DSL and or query type (e.g., queries requesting links, queries requesting links between nodes of two different data types, queries requesting links filtered by connection strength, and the like). Once the targeting data is extracted using the rules-based and or machine learning techniques, the unified query generator 326 generates the unified queries 327A, ..., 327N by serializing the targeting data into the framework language The unified queries 327A, ..., 327N enable the featurizer service 332 to read input targeting any of the available graph databases. The unified queries 327A, ..., 327N also streamline operation of the targeting module 334 by enabling the targeting module 334 to use the same data model to extract source information 339 for queries targeting any of the available databases.

The error parsing module 328 also identifies errors that occur during parsing of the query language to the framework language. The error parsing module 328 can generate error messages for each of the detected parsing errors. The error messages explain the errors and or identify the portion of the query that was not parsed accurately. The error parsing module 328 also handles errors during execution of the unified queries 327A, ..., 327N. Errors thrown by the graph abstraction layer 330 are detected by and or communicated to the error parsing module 328. Errors thrown by the graph abstraction layer can be documented in the framework language. Therefore, the error parsing module 328 can covert the errors from the framework language to the graph query language of the queries 322A, ..., 322N based on the query language to framework language mapping. Error messages expressed in the graph query language are returned to the query client 304 by the error parsing module 328 for display and or communication to a service or server.

A graph abstraction layer 330 receives the unified queries 327A, ..., 327N validated by the query resolver 324 and executes the queries 322A, ..., 322N across multiple graph databases implemented in multiple different graph technologies. The graph abstraction layer 330 includes a featurizer service 332 and a featurizer manager 342 that are used to execute the unified queries 327A, ..., 327N. The featurizer service 332 includes a targeting module 334 that extracts source data 339 from the unified queries 327A, ..., 327N. The source data 339 can include a link type, node type, or other graph component, a specific merchant ID, user ID, or other entity ID, attributes for a particular graph component, attributes for a particular graph component type, a database name, a database type, and any other information required to determine the information requested by the unified queries 327A, ..., 327N. For example, the source data 339 for a query that requests links between two or more nodes includes an entity ID for a source node, a target node type for nodes connected to the source node, and other data requested by the query. Query data models 336 are used to extract the source data 339 from the unified queries 327A, ..., 327N. The query data models 336 define the inputs, data types, and other components of the unified queries 327A, ..., 327N. The query data models 336 can be specific to each query and or DSL. For example, one query data model may define the components of a first unified query that requests a list of links between two or more nodes and a second different query data model may define the components of a second unified query that requests a list of groups of nodes that include links between two or more nodes. The query data models 336 define the components of the unified queries 327A, . . . , 327N in a particular DSL (e.g., GraphQL, Cypher, and the like). Therefore, the targeting module 334 can extract source data 339 from unified queries 327A, . . . , 327N written in any DSL by selecting the query data model 336 that corresponds to the query language of the particular unified queries 327A, . . . , 327N.

To extract source data 339, the targeting model 334 parses the unified queries 327A, . . . , 327N based on the selected query data model 336. For example, the targeting module 334 can identify the function and type of data included in each portion of the unified queries 327A, . . . , 327N based on the query components defined in the selected query data model 336. The targeting module 334 can then filter out all of the portions of the unified query that include source data 339 and extract the source data fields (e.g., the specific data requested by the query) from the filtered portions of the query. The targeting module 334 can then aggregate all of the extracted source data fields in a source data file or other machine readable format used to store source data 339.

The featurizer service 332 transmits the extracted source data 339 to a manager orchestrator 338 to determine the databases required by the unified queries 327A, . . . , 327N. To determine the databases that include data requested by the unified queries 327A, . . . , 327N, the manager orchestrator 338 uses mapping data 340 that associates the graph components included in the source data 339 with databases that include data related to the graph components. For example, the mapping data 340 is a file that includes a list, schema, or other mapping that lists the graph component types and or data types (e.g., fraud nodes, email nodes, merchant nodes, connection types, node attributes, connection attributes, and the like) and or the entity IDs (e.g., Merchant 123, User XYZ, and the like) included in each graph and or database. The mapping data 340 can include a list of the graph component types, data types, and or entity IDs in each available database. The mapping data 340 can also define the graph technology used to implement each of the databases. For example, to determine the databases required by a particular unified query requesting links between a source node for a particular merchant ID and target nodes have a fraud data type, the merchant ID for the source node and the fraud data type for the target nodes are extracted from the source data 339. The manager orchestrator 338 performs a global search on the mapping data 340 to locate databases having the merchant data type and or particular merchant ID for the source node and the fraud data type for the target nodes. Databases including graphs having nodes that match the source node and the target node are selected by the manager orchestrator 338 and provided to the featurizer service 332.

To execute the query on the selected databases, the featurizer service 332 requests the graph database managers 344A, . . . , 344N for each of the selected databases. To reduce the execution time for queries targeting multiple databases, the featurizer service 332 can send one or more unified queries 327A, . . . , 327N to multiple graph database managers 344A, . . . , 344N. The multiple queries sent by the featurizer service 332 can include one unified query per unique graph database and or graph database technology. For example, a unified query that requests the strongest connection for a particular merchant ID to a fraud node targeting two graphs in different databases that have the same schema (e.g., both graphs include connections between merchant type nodes and fraud type nodes) can be sent to the graph database manger corresponding to each of the two target databases. To send the multiple queries, the featurizer service 332 aggregates all of the unified queries 327A, . . . , 327N targeting a particular entity (e.g., a merchant ID or other node, link, vertex, field, path or other property) and or entity type included in a first graph database (e.g., a database implemented in TigerGraph) into a first query. All of the unified queries 327A, . . . , 327N targeting a particular entity and or data type included in a second database (e.g., a database implemented in AWS Neptune) are aggregated into a second query. The first and second queries are sent to their respective graph database mangers and executed in parallel to provide the strongest connection included in each database. The featurizer service 332 aggregates the results and compares the connection strength for the strongest connections to return the strongest connection in each database and the strongest overall connection.

The featurizer manager 342 uses the graph database managers 344A, . . . , 344N selected by the featurizer service 332 to execute the query on multiple graph databases. Each of the graph database managers 344A, . . . , 344N includes connection information that is specific to one or more graph databases and or graph technologies. The connection information includes connectors for standardized file formats (e.g., connectors for the artificial intelligence markup language (AIML) dialect of XML, JSON, and the like) that enable batch processing and other efficient processing of multiple queries and increase stability the graph database during query execution. The connection information included in the graph database managers 344A, . . . , 344N also includes drivers and other connectors for services used to manage the graph database (e.g., a data service that updates the data included in the graph database), filter query results (e.g., the filtering module 352), modify query results, generate visualizations illustrating the query results, and the like.

The featurizer manager 342 uses the connection data included in the selected graph database managers 344A, . . . , 344N to connect to one or more graph databases implemented on multiple graph technologies. The connection information can include connectors for standardized file formats (e.g., connectors for the artificial intelligence markup language (AIML) dialect of XML, JSON, and the like) that enable batch processing and other efficient processing of multiple queries and increase stability the graph database during query execution. The connection information included in the graph database managers 344A, . . . , 344N can also include drivers and other connectors for services that interact with the graph databases. For example the graph database managers 344A, . . . , 344N may included connectors for services used to manage the graph database (e.g., the graph database manager, a data service that uploads new data to the graph databases, and the like), filter query results (e.g., the filtering module 352), modify query results, generate visualizations illustrating the query results, and the like. The connection information included in the graph database managers 344A, . . . , 344N is specific to a particular graph databases and or graph technology used to implement the particular graph database. For example, the featurizer manager 342 can connect to a first graph database implemented on TigerGraph, a second graph database implemented on AWS Neptune, and a third graph database implemented on DSE Graph using the connection information included in the graph database managers 344A, . . . , 344N for each of the three databases.

Once connected, featurizer service runs the unified queries 327A, . . . , 327N on the graph database managers 344A, . . . , 344N to retrieve data from each of the databases targeted by the query. To run the unified queries 327A, . . . , 327N, the featurizer service 332 provides source data 339 to each of the selected graph database managers 344A, . . . , 344N. The graph database managers 344A, . . . , 344N for each database generate a query in the query language for the particular database and or database technology connected to each graph database manager. The queries generated by the graph database managers 344A, . . . , 344N are used to search the target databases for the specific entity and or link type included in the unified query. For example, the unified query can request all of the fraud links for the merchant node "payment merchant 1" that have a link length of 5 or less or are within another pre-determined link length threshold. To execute the unified query, all of the links between fraud instance nodes and "payment merchant 1" are extracted from the identified graphs by the graph database managers 344A, . . . , 344N to generate raw query results.

Query results retrieved by the graph database managers 344A, . . . , 344N are in the query language of the database and or database technology containing the results. To standardize the results into a uniform output, the graph database managers 344A, . . . , 344N convert the database and or database technology specific raw query results into normalized query results. For example, the graph database managers 344A, . . . , 344N may locate the source data 339 and query results for the source data 339 within the raw query results expressed in a particular graph query language. The graph database managers 344A, . . . , 344N extract the source data 339 and query results for each piece of source data from the raw query results. The graph database managers 344A, . . . , 344N serialize the query results into a known framework (e.g., JSON, XML, and the like) and convert the serialized query results into a unified data layer model that represents query results from all of the available databases in a standardize format readable by the featurizer service 332. The standardized query results from each of the graph database managers 344A, . . . , 344N are aggregated by the featurizer service 332 and normalized by converting the aggregate query results into the DSL format defined in the query data model 336. The normalization by the featurizer service 332 ensures the results for the queries 322A, . . . , 322N are expressed in the same DSL format as the original query to keep both the inputs and outputs of the unified graph query service 306 in the same unified language. Unifying the language of the inputs and query results ensures users only need to know one DSL to use the unified graph query service 306. The unified DSL also standardizes the query results so that they may be used by servers, services, and other automated systems without requiring any a conversion or re-formatting step.

The feature data and other aggregate query results returned from the graph databases 370A, . . . , 370N are transmitted to a feature generator 350 for additional processing. For example, the feature generator 350 processes feature data extracted by the featurizer service 332 to generate features 360 used to train machine learning models. The illustrated feature generator 350 includes a filtering module 352 and a function generator 354 that modify the feature data to generate the features 360. The filtering module 352 filters the feature data and other aggregate query results based on one or more conditions included in the query data 320 and or the unified queries. The filtering module 352 filters the feature data and other aggregate query results based on a particular value for an attribute and or field associated with a graph component, entity ID, or other piece of source data 339. For example, the filtering module 352 selects all of the fraud links from the feature data or other aggregate query results that have a minimum and or maximum length (i.e., a minimum or maximum number of nodes positioned between the connected nodes identified in the fraud links). In another example, the filtering module 352 selects all of the fraud links from the feature data that or exceed or are below a pre-determined connection strength threshold (i.e., a threshold that describes the frequency or total number of times the connected nodes interact with each other and or other nodes included in the connection). In another example, the filter module 352 selects the links having the shortest link length and or selects all of the links from a merchant type node to a fraud type node that have a device type node with the link path. The filtering module 352 can also select all or a subset of the feature data and other aggregate query results based on an entity location, an entity creation date, number of transactions with another entity, or any other condition.

The function generator 354 performs additional operations that modify the raw and or filtered feature data and other query results. The function generator 354 also performs operations that help determine the values of one or more of the filtering conditions for a link or other graph component included in the feature data and other aggregate query results. For example, the function generator 354 runs one or more custom functions on the raw and or filtered feature data and other query results. The custom functions can calculate a value, statistics, or other metric based on the aggregate and or filtered feature data. For example, functions run by the function generator 354 calculate connection strength, determine a link length, determine the values for attributes associated with a graph component, entity ID, or other source data, determine one or more of the filtering conditions used by the filtering module 352, and the like. The custom functions can also sort or aggregate feature data and other query results by one or more of attributes associated with one or more graph components, entity IDs, and or other pieces of source data. For example, the custom functions run by the function generator 354 sort the fraud links by the most recent link date, aggregate all of the fraud links having a link date with the last five years, sort the fraud links by the highest connection strength, aggregate all of the fraud links having a connection strength of at least 0.5, and the like. The function generator 354 may also run one or more custom functions that process query results to generate outputs. The custom functions defined in the unified queries 327A, . . . , 327N and may be generated dynamically based on inputs received in the query client 304. For example, the unified queries 327A, . . . , 327N may define a new function that returns a "yes" result if a node associated with a particular entity ID is directly connected to a fraud node (e.g., has a link to a fraud node that has a link length of 1). The new function can return a "false" result if the node associated with a particular entity ID is not directly connected to a fraud node. The function generator 354 may run custom functions defined in the unified queries 327A, . . . , 327N to enable users to dynamically process query results. The function generator 354 also generates one or more graphs, charts, or other visualizations used to represent the raw and or filtered feature data and other query results. The raw feature data generated by the graph database manager, the filtered feature data generated by the filtering module 352, and the modified feature data generated by the function generator 354 are used as features 360 for training a machine learning model and or generated a real time prediction for models in a machine learning platform as described below in FIG. 4.

Figure 4:
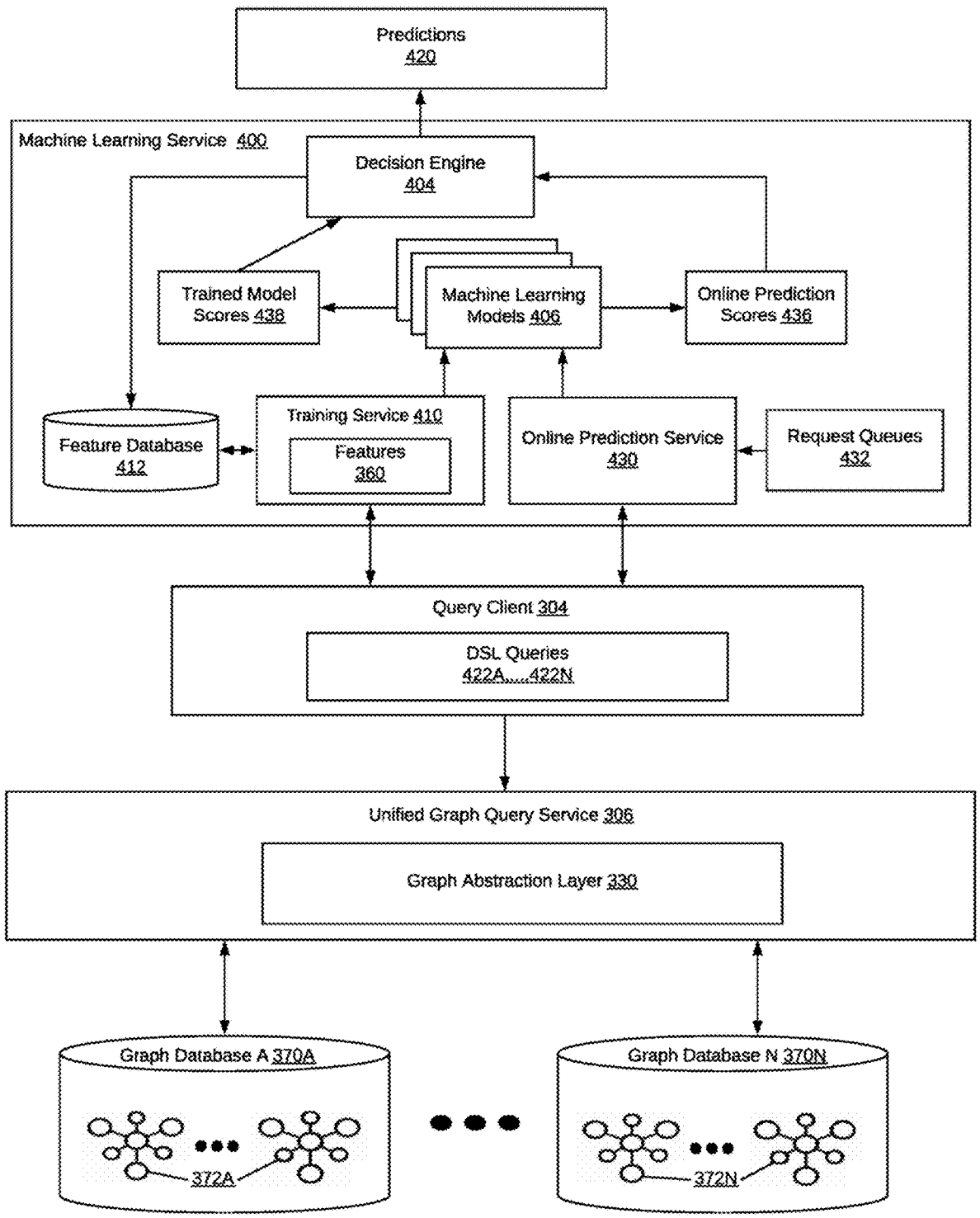
FIG. 4 shows an example integration of a service with the example system shown in FIG. 3 according to various embodiments of the present disclosure.

FIG. 4 illustrates an example integration of one or more services with the unified graph query service 306. For example, the unified graph query service 306 can be integrated with a machine learning service 400 that includes a training service 410 and an online prediction service 430. The online prediction service 430 includes one or more request queues 432 that receive prediction requests from one or more applications connected to the online prediction service 430. For example, the request queues 432 can store fraud clearance queries and other prediction requests received from a financial services application. The fraud clearance queries are used to predict whether a user initiating a transaction on the financial services application is a fraudulent user or a legitimate user. The fraud clearance queries and other prediction requests stored in the request queues 432 can be generated automatically in response to a pre-determined triggering event on the one or more applications. For example, an event that initiates a transaction on the financial services platform.

To resolve the prediction requests stored in the request queues 432 the online prediction service 430 that queries one or more of the graph databases 370A, ..., 370N to retrieve data required to make a prediction requested in the prediction requests. To retrieve the data required to make the prediction, the online prediction service 430 submits DSL queries 422A, ..., 422N that request the required data to the query client 304. The query client 304 submits the DSL queries 422A, ..., 422N to the unified graph query service 306. The graph abstraction layer 330 runs the DSL queries 422A, ..., 422N on the multiple graph databases 370A, ..., 370N as described above. The normalized query results generated by the graph abstraction layer 330 are returned to the online prediction service 430. The online prediction service 430 may modify the query results to generate online prediction scores 436 based on the query results and or an output from the machine learning models 406. For example, the online prediction service 430 filters, scales, and or input the query results into one or more of the machine learning model 406 or a custom function (e.g., a function that determines a fraud risk score based on a number of links between a particular user and fraud nodes) to generate the online prediction scores 436.

The online prediction scores 436 are then input into a decision engine 404 which generates a prediction 420 based on the score. The decision engine 404 may be a classification layer that includes one or more rules or conditions that generate a prediction 420 based on the online prediction scores 436. Predictions 420 generated by the online query service 430 may be consumed by the one or more applications to cause the application to perform a task and or prevent the application from performing a task. For example, the decision engine 404 may generate fraud clearance predictions based on a fraud risk score threshold. Fraud risk scores equal to and or lower than 3 or any other number defined by the decision engine 404 can result in a prediction of a fraudulent user and cause the transaction to be canceled. Fraud risk scores higher than the fraud risk score threshold (e.g., 3 or any other number defined by the decision engine 404) can result in a prediction of a legitimate user and cause the transaction to proceed.

The online prediction service 430 can also generate predictions using a rules-based model. To generate the rules based predictions, the online prediction service 430 queries one or more of the graph databases 370A, ..., 370N to retrieve data required to make a prediction included in a prediction request (e.g., a prediction request generated based on a triggering event in an application connected the machine learning service. To retrieve the data required to make the prediction, the online prediction service 430 submits DSL queries 422A, ..., 422N that request the required data to the query client 304. The query client 304 submits the DSL queries 422A, ..., 422N to the unified graph query service 306. The graph abstraction layer 330 runs the DSL queries 422A, ..., 422N on the multiple graph databases 370A, ..., 370N as described above. The normalized query results generated by the graph abstraction layer 330 are returned to the online prediction service 430. The online prediction service 430 inputs the normalized query results into a rules-based model to generate online prediction scores 436. The online prediction scores 436 are then input into a decision engine 404 which generates a prediction 420 based on the score. The rules-based predictions 420 generated by the online query service 430 are consumed by the one or more applications that generated the prediction request. The predictions 420 can cause the application to perform a pre-defined task and or prevent the application from performing a pre-defined task as described above.

The graph query service 306 exposes the graph databases 370A, ..., 370N to the training service 410 to enable query results generated from data included in one or more graphs to be used as training data for training one or more machine learning models 406. To generate training data that includes query results, the training service 410 generates one or more DSL queries 422A, ..., 422N that extract specific data used to train one or more machine learning models 406. Query results generated in response to the DSL queries 422A, ..., 422N are provided to the training service 410. The training service 410 processes the query results to generate features 360 used to train the machine learning models 406. For example, features 360 for training a fraud detection model can include the number of links between nodes labeled with particular entity IDs (e.g., specific companies, users, payment merchants, and other entities) and fraud type nodes associated with known fraudulent entities and or instances of fraud. Once trained on the above features 360, a fraud detection model predicts if an input entity (e.g., an ID for an entity that is not included in the training dataset) having a certain number of connections to instances of fraud (e.g., links between nodes labeled with the entity ID and fraud type nodes) is a fraudulent entity based on the number of fraud links for the entity ID and other similar entity IDs and other historical data included in the training dataset.

New data is constantly added to the graph databases 370A, ..., 370N. For example, new nodes are added every time a new user is added to the platform and new links are added every time a transaction or other interaction occurs between two or more users. As new data accumulates over time, features 360 generated based on the new data are be used to improve the accuracy of the machine learning models. For example, new features 360 for training the fraud detection model generated from the newly added data can include links to new known fraudulent entities (e.g., connections between new or existing entities and new fraud type nodes), links between new entities and existing fraudulent entities, and the like. Re-training the fraud prediction model on the new features 360 can improve the accuracy of the fraud predictions generated by the model by giving the model insight into previous predictions. For example, the weights or other learnable parameters of the model are adjusted to correct for a previous incorrect prediction that was revealed by the updated data. For example, if a new fraudulent entity included in the updated data was previously predicted by the model to be a legitimate entity and not an instance of fraud, re-training the model corrects for this incorrect prediction to ensure similar incorrect predictions are not generated in the future. The weights or other learnable parameters of the model can also be modified based on re-training on a larger set of features (e.g., the new features plus the previously generated features) to transfer knowledge from a larger and more diverse set of entities to the model.

Additionally, retraining on the new larger set of features can decrease the accuracy of the original fraud prediction model. The decrease in accuracy indicates a need to train more specific models to generate fraud predictions for a more specific subset of entities. For example, an omnibus model that predicts fraud for all companies can be replaced with a suite of more granular models that predict fraud for companies in the US or any other specific region or location. Replacing omnibus models with more granular model architectures that include ensembles of more specific models can also handle fraud predictions based on company size, activity level, and other metrics. To facilitate training additional, more specific models, new DSL queries 422A, . . . , 422N are be generated by the training service 410. The unified graph query service 306 supports the dynamic development of new features by executing the new queries on the graph databases 370A, . . . , 370N without requiring development of a query specific API or other graph database connection. The flexibility of the unified graph query service 306 increases the speed and efficiency of feature generation to enable more accurate machine learning models 406 to be developed through training on features that are more informative of a particular prediction target.

To ensure the training service 410 receives features 360 generated from the most current data, the unified query service 306 is configured to continuously extract query results from the graph databases 370A, . . . , 370N. The new query results extracted from the graph databases 370A, . . . , 370N are used by the training service 410 to generate new features 360. For example, the unified query service executes the DSL queries 422A, . . . , 422N received from the query client 304 according to a pre-defined schedule (e.g., every hour, every day, every week, or any other period of time). To execute the DSL queries 422A, . . . , 422N, the unified graph query service 306 uses the graph abstraction layer 330 shown in FIG. 3 as described above. The graph abstraction layer 330 models data received from multiple graphs 372A, . . . , 372N included in the one or more graph databases 370A, . . . , 370N to execute the DSL queries 422A, . . . , 422N across all of the graph databases 370A, . . . , 370N regardless of the graph technology used to implement each of the graph databases 370A, . . . , 370N.

The query results extracted by the graph abstraction layer 330 are used by the training service 410 to generate features 360. The features 360 can be stored in a feature database 412 included in the machine learning service 400. To train one or more machine learning models 406 using the features 360, the training service 410 assembles training datasets including the features 360 that are relevant to a particular prediction target. For example, to train a fraud prediction model, the training service 410 assembles a training dataset including the features that are relevant to fraud (e.g., the number links to an instance of fraud, the length of each of the links to fraud, the strength of the connections included in the links to fraud, and the like.) The training service 410 processes the training dataset according to one or more machine learning algorithms and or learning functions to generate the one or more machine learning models 406.

After training, the machine learning models 406 are exposed to other services and or applications. For example, the machine learning service 400 may receive a request for a prediction 420 from a fraud detection application. The request can include input data identifying the type of prediction and one or more target entities to be classified and or scored by the prediction 420. The training service 410 executes a function that trains one or more machine learning models 406 corresponding to the requested prediction type based on features 360 generated from the query results. For example, a data scientist or other user may request a prediction that determines if a particular characteristic of bank account data is a good indicator of fraud. The characteristic of bank account data may include a bank account connected to two users who have different last names. To test whether this characteristic is a good fraud indicator, the training service 410 may generate one or more DSL queries 422A, . . . , 422N that extract query results used to train the fraud prediction model described above. The training service 410 generates features 360 based on the query results and trains the fraud prediction model using the features 360. A list of entity IDs having the particular characteristic selected for analysis (e.g., user IDs having different last names that are linked to the same bank account) are run through the trained machine learning models 406 to generate trained model scores 438 for each entity ID. For example, the trained model scores 438 include a numeric value, classification, or other output. The trained model scores 438 are consumed by the decision engine 404 to generate the predictions 420. For example, if the trained model scores 438 indicate a particular entity ID exceeds a fraud links threshold or other threshold (e.g., 3 links or any other number defined by the decision engine 404) the decision engine 404 can generate a prediction 420 of "fraudulent" for the entity ID. If the trained model scores 438 indicate a particular entity ID does not exceed the fraud links threshold or other threshold the decision engine 404 may generate a prediction 420 of "legitimate" for the entity ID. The predictions 420 are then returned to the requesting application and or service.

The returned predictions 420 can be displayed to a user, consumed by process performed by an application or service, and or otherwise used by the application or service. For example, the predictions 420 for the user IDs having different last names that are linked to the same bank account are compared to an expected result (e.g., that the users are fraudulent). If the predictions 420 and expected results are within a pre-defined similarity threshold, (e.g., 80% similar or any other similarity metric) the characteristic tested by the predictions may be confirmed as a viable indicator and may be stored as a new feature. DSL queries 422A, . . . , 422N for the new feature may then be generated and executed on a pre-determined schedule to continuously generate the new features. If the predictions 420 and the excepted results are not within the pre-defined similarity threshold, the characteristic tested by the predictions 420 may be confirmed as providing no viable insight into the fraud and or another prediction target.

Other machine learning models 406 that can be trained by the training service 410 using feature data and other query results extracted by the unified query service 306 include models that identify marketing leads, potential new business partners, actions to improve the speed or efficiency of business operations, and the like. For example, the training service 410 can extract query results that include connections for a particular entity ID. Features 360 calculated based on the connection data are used to determine a profile for the particular entity ID (e.g., financial products used by the entity, the entity's industry, the transaction volume processed by the entity, and the like). Similar features 360 calculated based on the connection data for other entities in the graph database are used to train a machine learning model that identifies products and new services useful to users based on their profile information. The features 360 calculated for the entity ID are input into the machine learning model to generate predictions 420 for products and services that are used by entities having similar profiles to the user ID. The products and services included in the predictions 420 can be marketed to the particular entity ID.

The training service 410 can also train one or more machine learning models 406 that identify new business relationships using features 360 calculated from transaction activity extracted from the graph databases. The trained machine learning models generate predictions 420 for particular entity IDs that list other entities in the graph databases that are potential customers or vendors. The predictions 420 can be based on a comparison between the customers and vendors a particular entity ID frequently transacts with and other entity IDs that frequently transact with the same customers and vendors. Machine learning models 406 trained on transaction data extracted from the graph database can also be used to generate predictions 420 that suggest actions a particular entity ID user might need to take in the future (i.e., pay taxes, pay invoices, budget for upcoming expenses, and the like). The predictions 420 may be based on the transaction activity of other entity IDs that have similar profiles and or transaction data as the particular entity ID.

Figure 5:
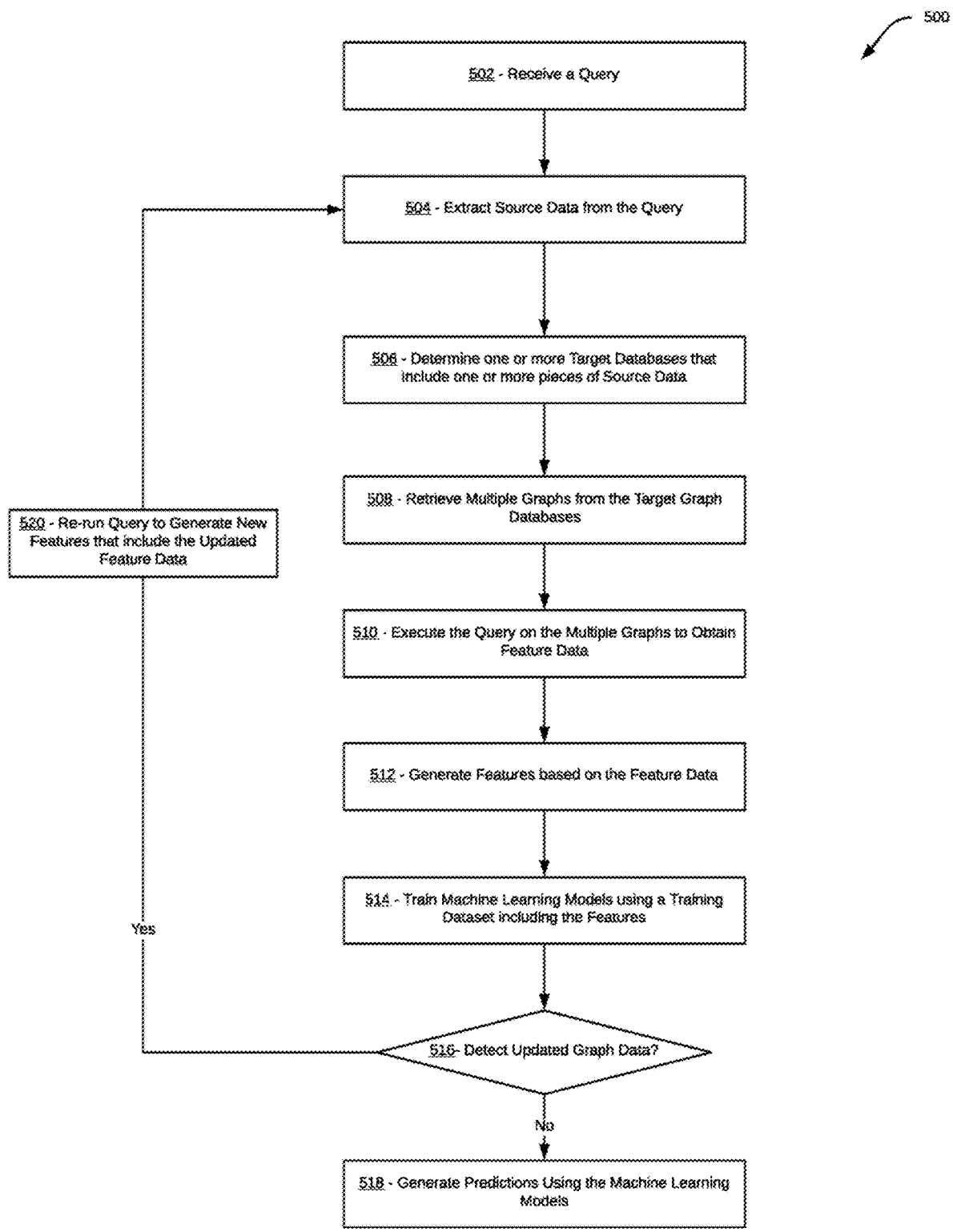
FIG. 5 is a flow diagram illustrating an example process for executing queries across one or more graph databases implemented on multiple graph technologies according to various embodiments of the present disclosure.

FIG. 5 illustrates an example process 500 for extracting feature data from one or more graph databases in accordance with the disclosed principles. The feature data includes features used to train a variety of machine learning models that make predictions that are useful in multiple fields (e.g., entity extraction, translation, fraud detection, account security, and the like). For example, the feature data can be used to train machine learning models that detect an instance of fraud (e.g., a fraud detection model), detect a piece of valid account data (e.g., an account validation model), determine a document type (e.g., a document classification model), determine an entity type (e.g., an entity classification model), detect a valid transaction (e.g., a transaction validation model), detect an error in a language translation and or a valid translation (a translation validation model), and the like. The query used to extract the feature data is run over multiple graph databases implemented using multiple graph technologies. The process 500 includes steps that increase interoperability between multiple graph databases and multiple graph technologies to streamline feature engineering, improve database system stability and performance, and reduce system operation and maintenance costs.

At step 502, a query is received. The graph database query can be written in any DSL. For example, GraphQL, Cypher, Gremlin, a custom DSL, or any other open source or proprietary query and manipulation language for APIs. The query requests data related to a graph component (e.g., a node, a node type, a vertex, a vertex type, a connection, a connection type, a link, link type, path, path type, an attribute associated with a particular node, a vertex, connection, link, and or path, and the like) included in one or more graphs stored on one or more graph databases. The one or more graph databases can be implemented using one or more different graph technologies.

To execute the query on graphs stored in graph databases implemented using multiple graph technologies, the featurizer service of the unified graph query service extracts source data and selects the graph managers for the graph databases including entity IDs and or data types defined in the source data. For example, at step 504, the targeting module extracts source data from the graph database query. The source data identifies one or more graph components (e.g., entity IDs and or node type, connection type, attribute type and the like) included in the query. The source data can also include and or be used to identify one or more graph databases targeted by the query. As described herein, the one or more graph databases targeted by the query can refer to the graph databases that store graphs including the one or more graph components included in the query. The featurizer service extracts the source data by parsing the query according to a query data model that defines the inputs (e.g., target entity IDs) and components (e.g., data types, filtering functions, query types) of the query.

At step 506, the manager orchestrator determines one or more target databases that include one or more pieces of source data included in the query. To facilitate mapping the entity IDs, data types, and other graph components included in the source data to the available graph databases, the manager orchestrator includes mapping data that lists each of the entities and or data types included in each graph and or graph database. The mapping data may include a schema for each graph included in a particular graph database and or other mapping used to search the graph databases for the graph components included in the source data. For example, the schema includes a table and or an organized list of the data types and fields included in a graph. For example, the schema lists each of the graph component types included in the graph as well as the attributes and or characteristics for each graph component type that are also stored in the graph.

The manager orchestrator determines the one or more target databases based on the source data and or a graph model for each of the available graph databases. To determine the target databases based on the source data and the graph models, the manager orchestrator receives the one or more graph components included in the query and the component type for each of the graph components from the source data. The manager orchestrator searches for the received graph components and or component types in each of the schemas included in the mapping data for each of the available graph databases. The manager orchestrator compares the graph component type for the one or more graph components and or the ID of the one or more specific graph components to the graph component types and or graph components listed in the schemas. Based on the comparison, the manager orchestrator identifies the graphs that include the one or more graph components included in the query and selects the graph database managers for each of the graph databases storing at least one of the identified graphs.

At step 508, the featurizer manager retrieves the graph database managers for the target graph databases. The graph database managers include connection data for connecting to the target graph databases. The connection data includes connectors for accessing and reading data from a particular database implementation and or deployment. The connection data can be specific to a particular graph technology used to implement the target graph databases and can include access credentials, links to a specific API or other endpoint, functions used to interact with the specific API or other endpoint, graph formatting specific to the graph technology, and the like. The graph database managers connect to the target graph databases using the database and or database technology specific connectors and other connection data. To execute the query on multiple graphs included in graph databases implemented on different graph technologies, featurizer services runs the query on the graph database managers connected to graph databases on different graph technologies using a different set of connection data for each graph database and or graph technology implementation.

At step 510, the unified graph query service executes the query on the multiple graphs to obtain feature data and other query results. To execute the query, the graph database manager for each of the target databases generates a query in the graph query language that corresponds to the technology used to implement the particular target database. The query results obtained by the graph database managers are normalized to covert the raw query results expressed in a graph query language to the DSL format. For example, each of the graph database managers normalizes the raw query results received by the particular graph database manager by converting the database specific raw query results formatted in the graph query language of the database queries by the particular graph database manager to the unified DSL format. The normalized query results are provided to the featurizer service for aggregation. The featurizer service combines all of the normalized raw query results to generate the feature data requested by the query. At step 512, one or more filters and or functions are applied to the feature data to generate features. For example, the feature data is filtered based on a connection strength, a length of a link, and or another attribute of a graph component included in the feature data. One or more functions can also be applied to the feature data to calculate additional characteristics of graph components included in the feature data.

The features generated based on the feature data are consumed by machine learning platforms and other services. For example, at step 514, the features are used to assemble a training data set that is used to train one or more machine learning models. To improve the accuracy of the models, the unified graph query service checks for updated graph data and other modifications to the graph databases, at step 516. The unified graph query service checks for updated graph data according to a pre-determined schedule (e.g., every hour, every day, every week, and or any other period of time) and or in response to a particular event (e.g., a new account was created, a new transaction or event was recorded, a sync between one or more graph databases and a relational database or another storage system, and the like). At step 518, if updated graph data is not detected (no at step 516), predictions are generated using the original trained machine learning model. At step 520, if updated graph data is detected (yes at step 516), the unified graph query system re-runs the query to generate new features that include the updated feature data. The machine learning model is re-trained on the new features to improve the accuracy of the original trained model. For example, re-training modifies one or more weights included in the original trained model based on insights captured from the updated graph data, correct and or in-correct predictions previously made by the model that are confirmed in the updated graph data, and the other insights from the updated feature data.

Figure 6:
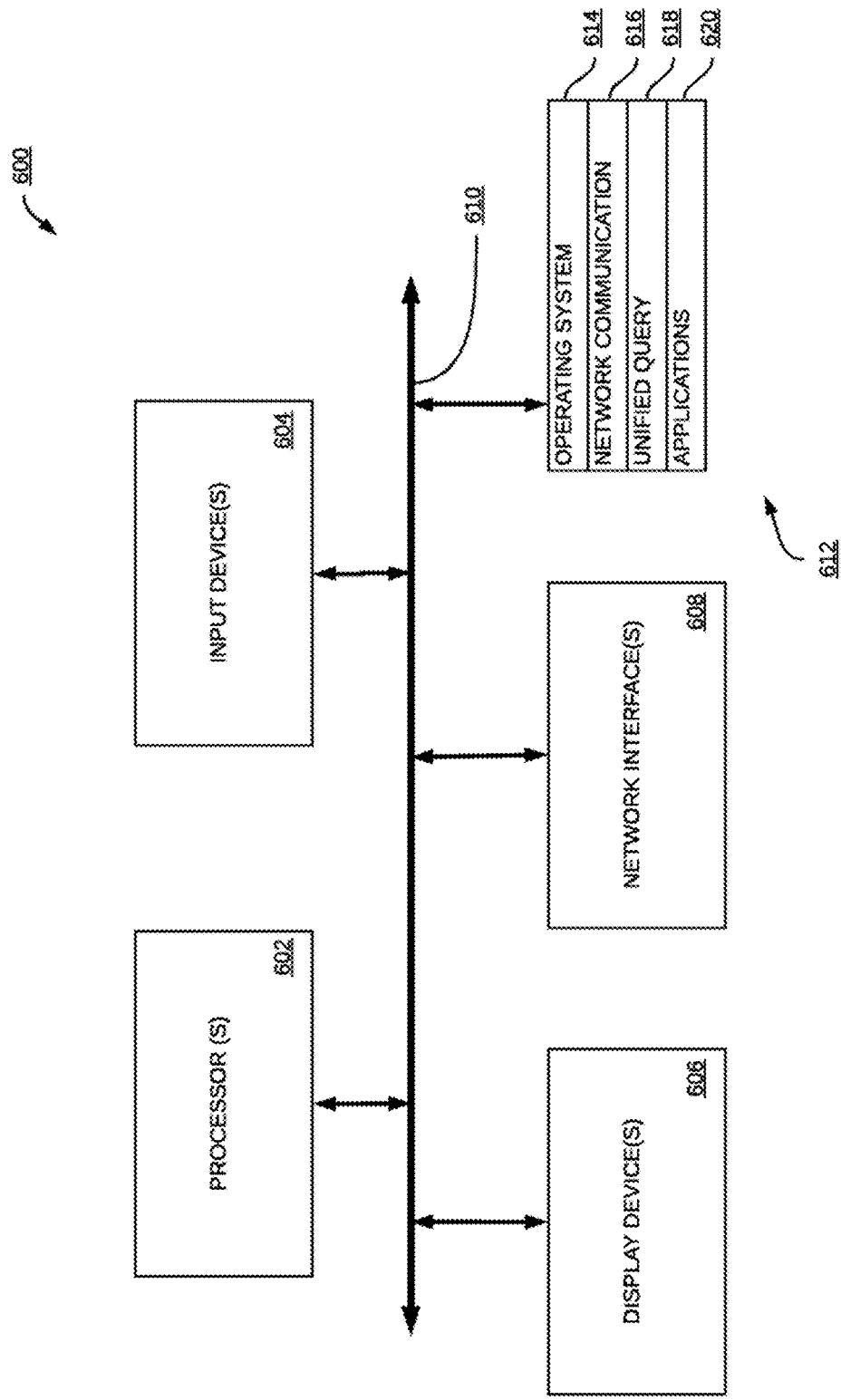
FIG. 6 is a block diagram illustrating an example computing device according to an embodiment of the present disclosure.

FIG. 6 shows an example computing device according to an embodiment of the present disclosure. For example, computing device 600 may function as client device 150, first server 120, second server 130. The computing device 600 may include a unified query service that executes query across graphs stored in multiple graph databases implemented using different graph technologies. The computing device 600 may be implemented on any electronic device that runs software applications derived from compiled instructions, including without limitation personal computers, servers, smart phones, media players, electronic tablets, game consoles, email devices, etc. In some implementations, the computing device 600 may include one or more processors 602, one or more input devices 604, one or more display devices 606, one or more network interfaces 608, and one or more computer-readable mediums 612. Each of these components may be coupled by bus 610, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, camera, and touch-sensitive pad or display. Bus 610 may be any known internal or external bus technology, including but not limited to ISA, EISA, PCI, PCI Express, USB, Serial ATA or FireWire. Computer-readable medium 612 may be any non-transitory medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 612 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 612; controlling peripheral devices (e.g., disk drives, printers, etc.) which can be controlled directly or through an I/O controller; and managing traffic on bus 610. Network communications instructions 616 may establish and maintain network connections (e.g., software for implementing communication protocols, such as TCP/IP, HTTP, Ethernet, telephony, etc.).

Unified query instructions 618 may include instructions that enable computing device 600 to function as a unified query service and/or to execute graph database queries on multiple graph databases and or across multiple graph database technology implementations as described herein. Application(s) 620 may be an application that uses or implements the processes described herein and/or other processes. The processes may also be implemented in operating system 614. For example, application 620 and/or operating system may create tasks in applications as described herein.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method of extracting data from one or more graph databases, the method comprising:
   receiving a query written in a first query programming language of a plurality of query programming languages each being specifically configured to be executable by a respective graph database application of a plurality of graph database applications, the query requesting data related to a graph component stored in the one or more graph databases;
   determining one or more target graph databases that include the graph component based on source data extracted from the query and mapping data for each of the one or more graph databases;
   selecting a graph database manager for each of the one or more target graph databases, the graph database manager including connection data for a particular target graph database;
   generating a second query for the data in a second query programming language of the plurality of query programming languages, wherein the second query programming language is the query programming language executable by the particular target graph database;
   running the second query on the graph database manager to obtain query results formatted in a particular graph query language that corresponds to the particular target graph database associated with the graph database manager;
   normalizing the query results to generate feature data formatted in the first query programming language; and
   processing the feature data by a graph database application configured to execute the first query programming language.

2. The computer implemented method of claim 1, further comprising:
   filtering the feature data based on a condition included in the query; and
   storing the filtered feature data in a training dataset used to train a machine learning model for determining at least one of an instance of fraud, a piece of valid account data, a document type, an entity type, a valid transaction, or a valid translation.

3. The computer implemented method of claim 1, further comprising:
   scoring the feature data using a machine learning model;
   determining a prediction based on the scored feature data; and
   transmitting the prediction to an application based on a triggering event, the application being adapted to perform a task based on the prediction.

4. The computer implemented method of claim 1, further comprising:
   executing a function on the feature data that determines an attribute of the graph component; and
   storing the feature data and the attribute as a feature for training a machine learning model used to determine at least one of an instance of fraud, a piece of valid account data, a document type, an entity type, a valid transaction, or a valid translation.

5. The computer implemented method of claim 4, wherein the attribute includes at least one of a connection strength for a connection that includes the graph component, a length of a link that includes the graph component, or a value for a characteristic of the graph component.

6. The computer implemented method of claim 1, further comprising:
   running the query on the one or more graph databases according to a pre-defined schedule to continuously generate feature data; and
   transmitting the feature data to a machine learning platform that assembles training datasets that include the feature data, the training datasets being usable to train a machine learning model for determining at least one of an instance of fraud, a piece of valid account data, a document type, an entity type, a valid transaction, or a valid translation.

7. The computer implemented method of claim 1, wherein the mapping data includes a list of data types included in each of the one or more graph databases.

8. The computer implemented method of claim 1, further comprising:
   updating the one or more target graph databases by storing new data related to the graph component;
   executing the query on the updated one or more target graph databases to generate updated feature data associated with the graph component, wherein the updated feature data is based on a portion of the new data related to the graph component; and
   transmitting the updated feature data to a machine learning platform that assembles updated training datasets that include the updated feature data, the updated training datasets being usable to improve an accuracy of a machine learning model based on a comparison between the updated training datasets and one or more predictions generated by the machine learning model.

9. The computer implemented method of claim 1, further comprising:
   comparing the query to a schema file for the first query programming language; and
   validating the query based on determining the query matches the schema file for the first query programming language.

10. The computer implemented method of claim 1, further comprising:
    parsing the query to identify an error included in the query; and
    transmitting an error message that includes the error and an explanation that describes the error.

11. A system for extracting feature data from one or more graph databases, the system comprising:
    a memory including executable instructions; and
    a processor configured to execute the executable instructions and cause the system to:
      receive a query written in a first query programming language of a plurality of query programming languages each being specifically configured to be executable by a respective graph database application of a plurality of graph database applications, the query requesting data related to a graph component stored in the one or more graph databases;
      determine one or more target graph databases that include the graph component based on source data extracted from the query and mapping data for each of the one or more graph databases;
      select a graph database manager for each of the one or more target graph databases, the graph database manager including connection data for a particular target graph database;
      generate a second query for the data in a second query programming language of the plurality of query programming languages, wherein the second query programming language is the query programming language executable by the particular target graph database;
      run the second query on the graph database manager to obtain raw query results formatted in a particular graph query language that corresponds to the particular target graph database associated with the graph database manager;
      normalize the raw query results to generate feature data formatted in the first query programming language; and
      process the feature data by a graph database application configured to execute the first query programming language.

12. The system of claim 11, wherein the processor is further configured to:
    filter the feature data based on a condition included in the query; and
    store the filtered feature data in a training dataset used to train a machine learning model for determining at least one of an instance of fraud, a piece of valid account data, a document type, an entity type, a valid transaction, or a valid translation.

13. The system of claim 11, wherein the processor is further configured to:
    score the feature data using a machine learning model;
    determine a prediction based on the scored feature data; and
    transmit the prediction to an application based on a triggering event, the application being adapted to perform a task based on the prediction.

14. The system of claim 11, wherein the processor is further configured to:
- execute a function on the feature data that determines an attribute of the graph component; and
- store the feature data and the attribute as a feature for training a machine learning model used to determine at least one of an instance of fraud, a piece of valid account data, a document type, an entity type, a valid transaction, or a valid translation.

15. The system of claim 14, wherein the attribute includes at least one of a connection strength for a connection that includes the graph component, a length of a link that includes the graph component, or a value for a characteristic of the graph component.

16. The system of claim 11, wherein the processor is further configured to:
- run the query on the one or more graph database according to a pre-defined schedule to continuously generate feature data; and
- transmit the feature data to a machine learning platform that assembles training datasets that include the feature data, the training datasets being usable to train a machine learning model for determining at least one of an instance of fraud, a piece of valid account data, a document type, an entity type, a valid transaction, or a valid translation.

17. The system of claim 16, wherein the mapping data includes a list data types included in each of the one or more graph databases.

18. The system of claim 11, wherein the processor is further configured to:
- update the one or more target graph databases by storing new data related to the graph component;
- execute the query on the updated one or more target graph databases to generate updated feature data associated with the graph component, wherein the updated feature data is based on a portion of the new data related to the graph component; and
- transmit the updated feature data to a machine learning platform that assembles updated training datasets that include the updated feature data, the updated training datasets being usable to improve an accuracy of a machine learning model based on a comparison between the updated training datasets and one or more predictions generated by the machine learning model.

19. The system of claim 11, wherein the processor is further configured to:
- compare the query to a schema file for the first query programming language; and
- validate the query based on determining the query matches the schema file for the first query programming language.

20. The system of claim 11, wherein the processor is further configured to:
- parse the query to identify an error included in the query; and
- transmit an error message that includes the error and an explanation that describes the error.

\* \* \* \* \*